US012263455B2

(12) United States Patent
Ratigan et al.

(10) Patent No.: US 12,263,455 B2
(45) Date of Patent: Apr. 1, 2025

(54) HIGH-PRESSURE FLUID PROCESSING DEVICE CONFIGURED FOR BATCH PROCESSING

(71) Applicant: MICROFLUIDICS INTERNATIONAL CORPORATION, Westwood, MA (US)

(72) Inventors: Michael P. Ratigan, Scituate, RI (US); David G. Harney, Stoneham, MA (US); John Michael Bernard, Stoughton, MA (US)

(73) Assignee: IDEX MPT INC., Westwood, MA (US)

( * ) Notice: Subject to any disclaimer, the term of this patent is extended or adjusted under 35 U.S.C. 154(b) by 0 days.

(21) Appl. No.: 18/210,952

(22) Filed: Jun. 16, 2023

(65) Prior Publication Data

US 2023/0321616 A1 Oct. 12, 2023

Related U.S. Application Data

(63) Continuation of application No. 17/188,345, filed on Mar. 1, 2021, now Pat. No. 11,679,363, which is a (Continued)

(51) Int. Cl.
*B01F 33/83* (2022.01)
*B01F 25/50* (2022.01)
(Continued)

(52) U.S. Cl.
CPC .............. *B01F 25/50* (2022.01); *B01F 33/83* (2022.01); *B01F 35/2113* (2022.01); (Continued)

(58) Field of Classification Search
CPC ....... B02C 23/36; B01F 33/83; B01F 33/8361
See application file for complete search history.

(56) References Cited

U.S. PATENT DOCUMENTS 4,213,740 A 7/1980 Chien
4,994,984 A 2/1991 Massimo
(Continued)

OTHER PUBLICATIONS

International Search Report and Written Opinion dated Jul. 13, 2017 issued for International PCT Application No. PCT/US17/22141.
(Continued)

*Primary Examiner* — Jared O Brown
(74) *Attorney, Agent, or Firm* — K&L Gates LLP

(57) ABSTRACT

A high pressure processing device is configured to simplify batch processing. The high pressure processing device includes a processing module configured to reduce a particle size of a material or achieve a desired liquid processing result for the material, a pump configured to pump the material to an inlet of the processing module, a recirculation pathway configured to recirculate the material from an outlet of the processing module back to the pump, an input device configured to receive at least one user input variable, and a controller configured to (i) determine a number of pump strokes for the pump based on the user input variable, and (ii) control the pump according to the determined number of pump strokes so that the material makes a plurality of passes through the processing module.

19 Claims, 5 Drawing Sheets

Related U.S. Application Data continuation of application No. 15/457,117, filed on Mar. 13, 2017, now Pat. No. 10,933,428.

(60) Provisional application No. 62/307,838, filed on Mar. 14, 2016.

(51) Int. Cl.

| | |
|---|---|
| ***B01F 35/21*** | (2022.01) |
| ***B01F 35/22*** | (2022.01) |
| ***B02C 23/18*** | (2006.01) |
| ***B02C 23/22*** | (2006.01) |
| ***B02C 23/36*** | (2006.01) |
| ***B02C 25/00*** | (2006.01) |
| ***F04B 15/02*** | (2006.01) |
| ***F04B 49/08*** | (2006.01) |
| ***F04B 49/22*** | (2006.01) |
| *B01F 33/80* | (2022.01) |
| *F04B 9/10* | (2006.01) |
| *F04B 17/03* | (2006.01) |
| *F04B 43/04* | (2006.01) |
| *F04B 43/06* | (2006.01) |
| *F04B 43/12* | (2006.01) |
| *F04B 43/14* | (2006.01) |

(52) U.S. Cl.

CPC ...... *B01F 35/2115* (2022.01); *B01F 35/2209* (2022.01); *B02C 23/18* (2013.01); *B02C 23/22* (2013.01); *B02C 23/36* (2013.01); *B02C 25/00* (2013.01); *F04B 15/02* (2013.01); *F04B 49/08* (2013.01); *F04B 49/22* (2013.01); *B01F 33/8361* (2022.01); *F04B 9/10* (2013.01); *F04B 17/03* (2013.01); *F04B 43/04* (2013.01); *F04B 43/06* (2013.01); *F04B 43/1238* (2013.01); *F04B 43/14* (2013.01); *F04B 2205/09* (2013.01); *F04B 2205/10* (2013.01); *F04B 2205/11* (2013.01)

(56) References Cited

U.S. PATENT DOCUMENTS

| | | | | |
|---|---|---|---|---|
| 5,273,407 | A | 12/1993 | Jarchau et al. | |
| 5,384,714 | A | 1/1995 | Kidd | |
| 5,406,970 | A | 4/1995 | Marshall et al. | |
| 5,635,070 | A | 6/1997 | Allington et al. | |
| 6,135,628 | A | 10/2000 | DeStefano et al. | |
| 6,161,558 | A | 12/2000 | Franks et al. | |
| 6,321,860 | B1 | 11/2001 | Reddoch | |
| 6,566,490 | B1 * | 5/2003 | Manique | C07K 14/62 530/427 |
| 7,086,278 | B2 | 8/2006 | Gysling et al. | |
| 2008/0172141 | A1 * | 7/2008 | Simpson | B01F 35/213 700/265 |
| 2009/0269250 | A1 | 10/2009 | Panagiotou et al. | |
| 2009/0297362 | A1 | 12/2009 | Gallwey | |
| 2010/0326916 | A1 | 12/2010 | Wrazel et al. | |
| 2012/0053737 | A1 | 3/2012 | Valluri et al. | |
| 2012/0125840 | A1 | 5/2012 | Smith | |
| 2012/0303167 | A1 | 11/2012 | Heden et al. | |
| 2014/0314584 | A1 | 10/2014 | Nagura et al. | |
| 2014/0319071 | A1 | 10/2014 | Patel et al. | |
| 2015/0259123 | A1 | 9/2015 | Araki et al. | |
| 2016/0367954 | A1 | 12/2016 | Avergard | |
| 2017/0101618 | A1 | 4/2017 | Kamen et al. | |
| 2017/0197857 | A1 | 7/2017 | Whitener et al. | |
| 2018/0080444 | A1 | 3/2018 | Ting | |

OTHER PUBLICATIONS

Office Action dated Dec. 5, 2019 issued for European Patent Application No. 17767282.1.

Office Action dated May 9, 2023 issued for Canadian Patent Application No. 3017222.

* cited by examiner

HIGH-PRESSURE FLUID PROCESSING DEVICE CONFIGURED FOR BATCH PROCESSING

PRIORITY

The present application is a continuation of U.S. patent application Ser. No. 17/188,345 filed on Mar. 1, 2021, which is a continuation application of U.S. patent application Ser. No. 15/457,117 filed on Mar. 13, 2017, issued as U.S. Pat. No. 10,933,428, which claims priority to U.S. Provisional Application No. 62/307,838, filed Mar. 14, 2016, entitled, “High-Pressure Fluid Processing Device Configured for Batch Processing,” The entire disclosure of said applications are incorporated by reference herein in their entireties.

FIELD OF THE INVENTION

The present disclosure generally relates to apparatuses and methods related to a high-pressure fluid processing device, and more specifically to a high pressure mixer or homogenizer that is configured to simplify batch processing by recirculating material through a processing module a plurality of times.

BACKGROUND

High pressure fluid processing devices can be used for a variety of purposes, such as mixing or homogenizing unprocessed material. For example, homogenizers push unprocessed material through orifices at a high pressure, resulting in targeted particle size reduction or molecule formation. Impinging jet reactors also use high pressure for nanocrystallization.

SUMMARY

The present disclosure provides apparatuses and methods related to a high pressure processing device that is configured to simplify batch processing by recirculating material through a processing module a plurality of times. In a general embodiment, a high pressure processing device includes a processing module configured to reduce a particle size of a material or achieve a desired liquid processing result for the material, a pump configured to pump the material to an inlet of the processing module, a recirculation pathway configured to recirculate the material from an outlet of the processing module back to the pump, an input device configured to receive at least one user input variable, and a controller configured to (i) determine a number of pump strokes for the pump based on the user input variable, and (ii) control the pump according to the determined number of pump strokes so that the material makes a plurality of passes through the processing module.

In another embodiment, the at least one user input variable includes at least one of a batch size and a number of passes through the processing module.

In another embodiment, the at least one user input variable includes both of the batch size and the number of passes through the processing module.

In another embodiment, the at least one user input variable includes a volumetric efficiency for the material.

In another embodiment, the controller automatically determines a volumetric efficiency for the material and uses the volumetric efficiency for the material to determine the number of pump strokes for the pump.

In another embodiment, the pump is configured to pump the material through the processing module at a pressure of about 5,000 to 45,000 psi.

In another embodiment, the processing module includes one or more fixed geometry, variable geometry, or adjustable geometry orifices to reduce the particle size of the material at a micrometer or nanometer scale.

In another embodiment, the device includes at least one temperature sensor along the recirculation pathway, the at least one temperature sensor configured to measure a temperature of the material flowing through the recirculation pathway.

In another embodiment, the at least one temperature sensor is located downstream of the processing module and upstream of a reservoir configured to initially hold the material.

In another embodiment, the at least one temperature sensor is located downstream of the reservoir and upstream of the pump.

In another embodiment, the controller is configured to receive feedback from the at least one temperature sensor and stop or adjust the pump if the feedback indicates that the temperature of the material has exceeded a predetermined temperature.

In another embodiment, the controller is configured to save a status of the determined number of pump strokes when the pump is stopped or adjusted, restart or readjust the pump when the temperature is measured at an acceptable level, resume counting the determined number of pump strokes based on the saved status, and stop the pump after counting a last stroke of the determined number of pump strokes.

In another embodiment, the controller is configured to receive feedback from the at least one temperature sensor and adjust pressure through the recirculation pathway if the temperature of the material is above or below a temperature threshold or outside of a temperature range.

In another embodiment, the controller is configured to adjust the pressure through the recirculation pathway by controlling at least one of the pump, a drain valve or a pressure relief valve.

In another embodiment, the device includes a pressure sensor, and the controller is configured to adjust and maintain a desired pressure level based on feedback from the pressure sensor.

In another embodiment, the device does not include a heat exchanger in fluid communication with the recirculation pathway to adjust the temperature of the material.

In another embodiment, the controller is configured to receive feedback from a pressure sensor and stop or adjust the pump if the feedback indicates that the pressure is above or below a pressure threshold or outside of a pressure range.

In another embodiment, the controller is configured to save a status of the determined number of pump strokes when the pump is stopped or adjusted, restart or readjust the pump when the pressure is measured at an acceptable level, resume counting the determined number of pump strokes based on the saved status, and stop the pump after counting a last stroke of the determined number of pump strokes.

In another embodiment, the device includes a reservoir to hold the material before the material makes the plurality of passes through the processing module.

In another general embodiment, a high-pressure processing device includes a processing module configured to reduce a particle size of a material or achieve a desired liquid processing result for the material, a pump configured to pump the material to an inlet of the processing module, a recirculation pathway configured to recirculate the material from an outlet of the processing module back to the pump, and a controller configured to (i) determine a number of pump strokes for the pump based on a volumetric efficiency, and (ii) control the pump according to the determined number of pump strokes so that the material makes a plurality of passes through the processing module.

In another embodiment, the device includes an input device configured to receive at least one user input variable.

In another embodiment, the at least one user input variable includes at least one of the volumetric efficiency, a batch size, and a number of passes through the processing module.

In another embodiment, the pump is configured to pump the material through the processing module at a pressure of about 5,000 to 45,000 psi.

In another embodiment, the processing module includes one or more fixed geometry, variable geometry, or adjustable geometry orifices to reduce the particle size of the material at a micrometer or nanometer scale.

In another embodiment, the device includes at least one temperature sensor along the recirculation pathway, the at least one temperature sensor configured to measure the temperature of the material flowing through the recirculation pathway.

In another embodiment, the controller is configured to receive feedback from the at least one temperature sensor and stop or adjust the pump if the feedback indicates that the temperature of the material has exceeded a predetermined temperature.

In another embodiment, the controller is configured to save a status of the determined number of pump strokes when the pump is stopped or adjusted, restart or readjust the pump when the temperature is measured at an acceptable level, resume counting the determined number of pump strokes based on the saved status, and stop the pump after counting a last stroke of the determined number of pump strokes.

In another embodiment, the controller is configured to receive feedback from the at least one temperature sensor and adjust pressure through the recirculation pathway if the temperature of the material is above or below a temperature threshold or outside of a temperature range.

In another embodiment, the controller is configured to adjust the pressure through the recirculation pathway by controlling at least one of the pump, a drain valve or a pressure relief valve.

In another embodiment, the device includes a pressure sensor, and the controller is configured to adjust and maintain a desired pressure level based on feedback from the pressure sensor.

In another embodiment, the device does not include a heat exchanger in fluid communication with the recirculation pathway to adjust the temperature of the material.

In another embodiment, the device includes a pressure sensor along the recirculation pathway, the pressure sensor configured to measure the pressure through the recirculation pathway.

In another embodiment, the controller is configured to receive feedback from the pressure sensor and stop or adjust the pump if the feedback indicates that the pressure is above or below a pressure threshold or outside of a pressure range.

In another embodiment, the controller is configured to save a status of the determined number of pump strokes when the pump is stopped or adjusted, restart or readjust the pump when the pressure is measured at an acceptable level, resume counting the determined number of pump strokes based on the saved status, and stop the pump after counting a last stroke of the determined number of pump strokes.

In another general embodiment, a method of reducing a particle size of a material includes determining a volumetric efficiency for the processing of the material based on a volume pumped and a number of pump strokes, using the volumetric efficiency to determine a number of pump strokes necessary to pump the material through a processing module a desired number of times, controlling a pump so that the pump pumps the material for the determined number of pump strokes to recirculate the material through the processing module the desired number of times, and automatically stopping the pump after a last stroke of the determined number of pump strokes.

In another embodiment, the method includes pumping the material through the pump and into a container to determine the volumetric efficiency.

In another embodiment, the method includes determining at least one of a batch size and a number of passes through the processing module.

In another embodiment, the method includes inputting the at least one of the batch size and the number of passes through the processing module into a user interface.

In another embodiment, the method includes using the volumetric efficiency and the at least one of the batch size and the number of passes through the processing module to determine the number of pump strokes necessary to pump the material through the processing module the desired number of times.

In another embodiment, the method includes monitoring a temperature along a recirculation flowpath in fluid communication with the pump, and stopping or adjusting the pump if the monitored temperature is above or below a temperature threshold or outside of a temperature range.

In another embodiment, the method includes automatically restarting or readjusting the pump once the monitored temperature meets the temperature threshold or is within temperature range.

In another embodiment, the method includes saving the progress of the determined number of pumps strokes, and resuming the determined number of pump strokes when the monitored temperature drops to the acceptable level.

In another embodiment, the method includes monitoring a temperature of the material, and adjusting a pressure if the monitored temperature is above or below a temperature threshold or outside of a temperature range.

In another embodiment, the method includes adjusting the pressure by controlling at least one of the pump, a drain valve or a pressure relief valve.

In another embodiment, the method includes adjusting the pressure using feedback from a pressure sensor.

In another embodiment, the method includes adjusting the temperature of the material without using a heat exchanger.

In another embodiment, the method includes pumping the material through one or more fixed geometry, variable geometry, or adjustable geometry orifices of the processing module the desired number of times.

In another embodiment, the method includes pumping the material through the processing module at a pressure of about 5,000 to 45,000 psi.

In another embodiment, the method includes monitoring a pressure along a recirculation flowpath in fluid communication with the pump, and stopping or adjusting the pump if the monitored pressure is above or below a pressure threshold or outside of a pressure range.

In another embodiment, the method includes automatically restarting the pump once the monitored pressure meets the pressure threshold or is within the pressure range.

In another embodiment, the method includes saving the progress of the determined number of pumps strokes, and resuming the determined number of pump strokes when the monitored pressure meets the pressure threshold or is within the pressure range.

In another general embodiment, a high-pressure processing device includes a processing module configured to reduce a particle size of a material or achieve a desired liquid processing result for the material, a pump configured to pump the material to an inlet of the processing module, a recirculation pathway configured to recirculate the material from an outlet of the processing module back to the pump, means for determining a number of pump strokes for the pump based on a volumetric efficiency for the material, and means for controlling the pump according to the determined number of pump strokes so that the material makes a plurality of passes through the processing module.

In another general embodiment, a high pressure processing device includes an input module configured to receive information input by a user related to a batch process, a stroke determination module configured to calculate a total number of strokes needed to pump a material through a processing module based on the information input by the user, and a control module configured to control a pump to pump the material through the processing module for the determined number of pump strokes to recirculate the material through the processing module plurality of times.

In another embodiment, the device includes a sensor module configured to receive sensor readings related to the material pumped through the processing module.

In another embodiment, the device includes an output module configured to output information related to the material pumped through the processing module to be displayed for the user.

In another general embodiment, a high-pressure processing device includes a processing module configured to reduce a particle size of a material or achieve a desired liquid processing result for the material, a pump configured to pump the material to an inlet of the processing module, a recirculation pathway configured to recirculate the material from an outlet of the processing module back to the pump, a temperature sensor configured to measure a temperature of the material, and a controller configured to (i) receive a sensor reading from the temperature sensor indicative of the temperature of the material, (ii) adjust a pressure through the recirculation pathway to place the material at or about a desired temperature or within a desired temperature range, and (iii) control the pump so that the material makes a plurality of passes through the processing module while at or about the desired temperature or within the desired temperature range.

In another embodiment, the controller is configured to adjust the pressure through the recirculation pathway by increasing or decreasing a speed of the pump.

In another embodiment, the controller is configured to adjust the pressure through the processing module by opening or closing at least one valve.

In another embodiment, the device includes a pressure sensor, and the controller is configured to adjust the pressure through the processing device using feedback from the pressure sensor.

In another embodiment, the device includes a pressure sensor, and the controller is configured to control the pump so that the material makes the plurality of passes through the processing module while at or about the desired temperature or within the desired temperature range using feedback from the pressure sensor.

In another embodiment, the material is about the desired temperature if the material is within 10° C. of the desired temperature.

In another embodiment, the material is about the desired temperature if the material is within 5° C. of the desired temperature.

In another embodiment, the material is about the desired temperature if the material is within 1° C. of the desired temperature.

In another embodiment, the device includes an input device configured to receive at least one user input variable, and the controller is configured to determine a number of pump strokes for the pump based on the user input variable and control the pump according to the determined number of pump strokes so that the material makes the plurality of passes through the processing module.

In another embodiment, the controller is configured to determine a number of pump strokes for the pump based on a volumetric efficiency and control the pump according to the determined number of pump strokes so that the material makes the plurality of passes through the processing module.

In another general embodiment, a method of reducing a particle size of a material includes determining a number of pump strokes necessary to pump the material through a processing module a desired number of times, controlling a pump so that the pump pumps the material for the determined number of pump strokes to recirculate the material through the processing module the desired number of times using a recirculation pathway, measuring a temperature of the material while the pump pumps the material through the recirculation pathway, and adjusting a pressure within the recirculation pathway if the temperature of the material is above or below a temperature threshold or outside of a temperature range until the temperature of the material meets the temperature threshold or is within the temperature range.

In another embodiment, adjusting the pressure includes increasing or decreasing a speed of the pump.

In another embodiment, adjusting the pressure includes opening or closing a valve.

In another embodiment, the method includes counting the pump strokes while material meets the temperature threshold or is within the temperature range, but not while the material is above or below a temperature threshold or outside of a temperature range, and automatically stopping the pump after a last stroke of the determined number of pump strokes.

BRIEF DESCRIPTION OF THE FIGURES

Embodiments of the present disclosure will now be explained in further detail by way of example only with reference to the accompanying figures, in which.

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

Figure 1:
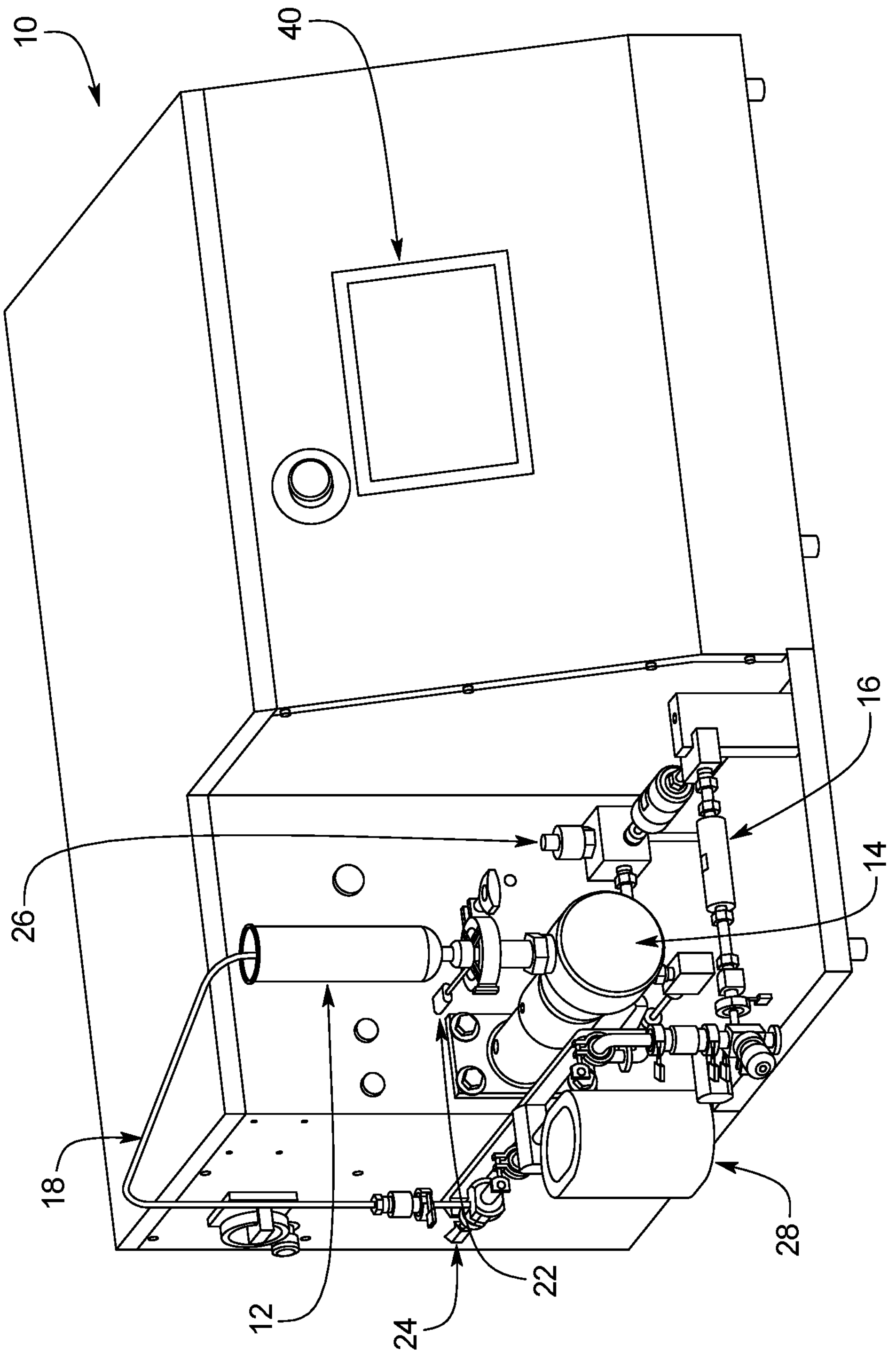
FIG. 1 shows a perspective view of an example embodiment of a high-pressure processing device according to the present disclosure.

FIG. 1 shows an example embodiment of a high-pressure processing device 10 according to the present disclosure. In an embodiment, device 10 can be a high pressure mixer or homogenizer. As illustrated, device 10 includes a reservoir 12, a pump 14 and a processing module 16 located along a recirculation pathway 18. Device 10 also includes an inlet temperature sensor 22, an outlet temperature sensor 24, a pressure sensor 26 such as a process pressure transducer, and a heat exchanger 28 along recirculation pathway 18. User interface 40 allows a user to program instructions into device 10, as explained in more detail below. The unprocessed material that passes through recirculation pathway 18 can be precisely controlled by a controller 20.

Figure 2:
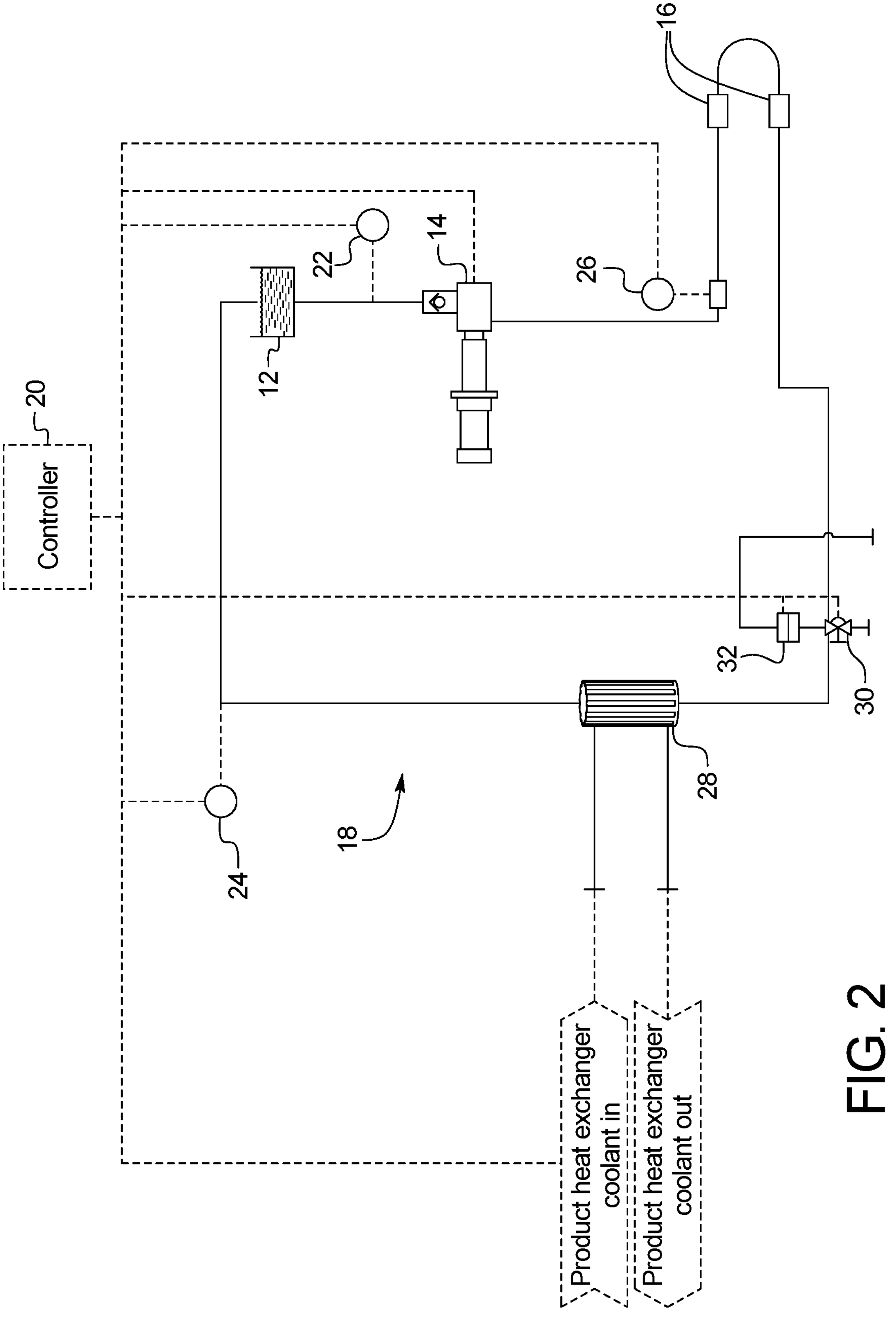
FIG. 2 shows a schematic of an example embodiment of the recirculation flowpath of the high-pressure processing device of FIG. 1.

FIG. 2 shows a schematic diagram of the recirculation pathway 18 through device 10. Recirculation path 18 is shown in solid lines, while the broken lines show communication between controller 20 and several elements of the system. As illustrated, recirculation pathway 18 can form a closed loop that places each of reservoir 12, pump 14 and processing module 16 in fluid communication with each other, so that unprocessed material can pass through reservoir 12, pump 14 and processing module 16 a plurality of times without being removed from recirculation pathway 18.

In use, the process begins by filling reservoir 12 with unprocessed material. The unprocessed material can then be pumped by pump 14 from reservoir 12 to processing module 16. Recirculation pathway 18 then allows the unprocessed material output from processing module 16 to be recirculated back to reservoir 12, so that the unprocessed material can make multiple passes through processing module 16.

In an embodiment, the unprocessed material can be, for example, nanoemulsions, nanosuspensions, narbon nanotubes, inkjet inks, toners, resins, sealants, waxes, LCD screen pigments, polymers, adhesives, preservatives, rheological agents, lubricants, liposomes, cells for cell disruption, collagen, suspended solids, and dispersions. Those of ordinary skill in the art will recognize other unprocessed material that can be processed using the methods and apparatuses discussed herein.

In an embodiment, pump 14 can be a positive displacement pump such as a reciprocating or rotary type pump, for example, a rotary lobe pump, a progressing cavity pump, rotary gear pump, a piston pump, a diaphragm pump, a screw pump, a gear pump, a vane pump, a regenerative (peripheral) pump, a peristaltic pump or an intensifier pump. Those of ordinary skill in the art will recognize other metering pumps 14 that are capable of pumping unprocessed material from reservoir 12 to processing module 16 with a series of pump strokes. In the illustrated embodiment, pump 14 is a piston pump that pumps unprocessed material through recirculation pathway 18 by moving back and forth in a series of strokes, with each stroke pumping a volume of unprocessed material from reservoir 12 to processing module 16. Each individual stroke can include a suction stroke and a discharge stroke, with the suction stroke pulling unprocessed material from reservoir 12 and the discharge stroke pushing the pulled unprocessed material to processing module 16.

The term "stroke" as used herein can include both a suction stroke and a discharge stroke, just a suction stroke, or just a discharge stroke, depending on the type of pump 14. A peristaltic pump, for example, operates by rolling at least one roller along flexible tubing, so a "stroke" of a peristaltic pump could for example be one rotation or a partial rotation of the roller (i.e., a full or partial discharge stroke). In another embodiment, pump 14 can be an intensifier pump, which uses an electrically, pneumatically, hydraulically powered actuator or linear motor to impart a linear force on a small area, utilizing mechanical advantage and generating increased pressure, with a "stroke" of an intensifier pump including, for example, both a suction stroke and a discharge stroke, just a suction stroke, or just a discharge stroke. In another embodiment, pump 14 can be a diaphragm pump, which is electrically, pneumatically, hydraulically or otherwise actuated with opposing bellows, causing suction and discharge strokes similar to those described above, with a "stoke" including, for example, both a suction stroke and a discharge stroke, just a suction stroke, or just a discharge stroke.

In an example embodiment, each pump stroke pumps approximately 0.1 mL/Stroke to 10 L/Stroke.

In an embodiment, processing module 16 includes one or more fixed geometry, variable geometry, or adjustable geometry orifices to reduce the particle size of the unprocessed material at the nanometer scale. In use, the unprocessed material is pumped into processing module 16 at a high velocity and a high pressure. For example, the unprocessed material can be pumped into processing module 16 at about 0 to 45,000 psi and about 0 to 400 meters per second. The energy input to the unprocessed material is controlled by the geometry of the flow path through turbulence and/or shear associated therewith. That is, the geometry of the flow path converts the high pressure into shear and impact forces, resulting in targeted nanoparticle size reduction or molecule formation. The one or more orifices of the processing module can include, for example, single or multiple channels, round, elliptical, rectangular or impinging channels, or annular channels with restrictive center stems.

In an example embodiment, reservoir 12 can be configured to hold 1 to 10,000 mL of unprocessed material. The unprocessed material can be recirculated through processing module 16 about 2 to 999 times to process the unprocessed material. In an example embodiment, the unprocessed material has a starting size of about 500 nm to 500 microns, and is processed in 2 to 50 passes to be reduced to an ending size of 10 nm to 10 microns.

Controller 20 can control pump 14 based on a variety of factors, for example, the temperature measured by inlet temperature sensor 22 and/or outlet temperature sensor 24. In an embodiment, inlet temperature sensor 22 is positioned to measure the temperature of unprocessed material pumped from reservoir 12 to processing module 16, and outlet temperature sensor 24 is positioned to measure the temperature of unprocessed material pumped from processing module 16 back to reservoir 12. Controller 20 is configured to received feedback from inlet temperature sensor 22 and outlet temperature sensor 24 and stop or adjust pump 14 if the inlet temperature and/or outlet temperature is outside of a predetermined range. Controller can also control heat exchanger 28 to raise or lower the temperature of the unprocessed material based on feedback from inlet temperature sensor 22 and/or outlet temperature sensor 24, or speed up or slow down pump 14 based on feedback from inlet temperature sensor 22 and/or outlet temperature sensor 24.

Controller 20 can likewise control pump 14 based on the pressure measured by pressure sensor 26. In the illustrate embodiment, pressure sensor 26 is positioned to measure the pressure of unprocessed material being output by pump 14 into processing module 16. The pressure measured at this point should be, for example, about 2,000 to 45,000 psi. If controller 20 determines based on feedback from pressure sensor 26 that the pressure between pump 14 and processing module 16 is outside of a predetermined range above or below 2,000 to 45,000 psi, controller can stop pump 14 or speed up or slow down pump 14.

In the embodiment illustrated in FIG. 2, device 10 also includes a low point drain valve 30 and a pressure relief valve 32, which can both be controlled by controller 20 in an embodiment. Low point drain valve 30 is located at a low point on recirculation pathway 18 and is configured to drain material from recirculation pathway if necessary. Pressure relief valve 32 is configured to release pressure from recirculation pathway 18, for example, if recirculation pathway 18 becomes plugged or backed-up or if the temperature of the unprocessed material needs to be lowered.

Heat exchanger 28 is configured to exchange heat between unprocessed material flowing back to reservoir 12 from processing module 16 and a coolant flowing through another pathway of heat exchanger 28. Specifically, heat exchanger 28 is configured to lower the temperature of the unprocessed material so that the unprocessed material can be recirculated back to reservoir 12 and then processing module 16. Heat exchanger 28 can also be used to raise the temperature of the unprocessed material in recirculation pathway 18 if desired. Those of ordinary skill in the art will recognize a variety of heat exchangers that can be used for this purpose.

In an embodiment, controller 20 monitors the temperature signals from inlet temperature sensor 22 and/or outlet temperature sensor 24 and controls heat exchanger 28 to raise and/or lower the temperature of the unprocessed material as desired. By monitoring the temperature signals and controlling the heat exchanger, controller 20 can precisely control the temperature of the unprocessed material as it makes multiple passes through processing module 16.

Figure 3:
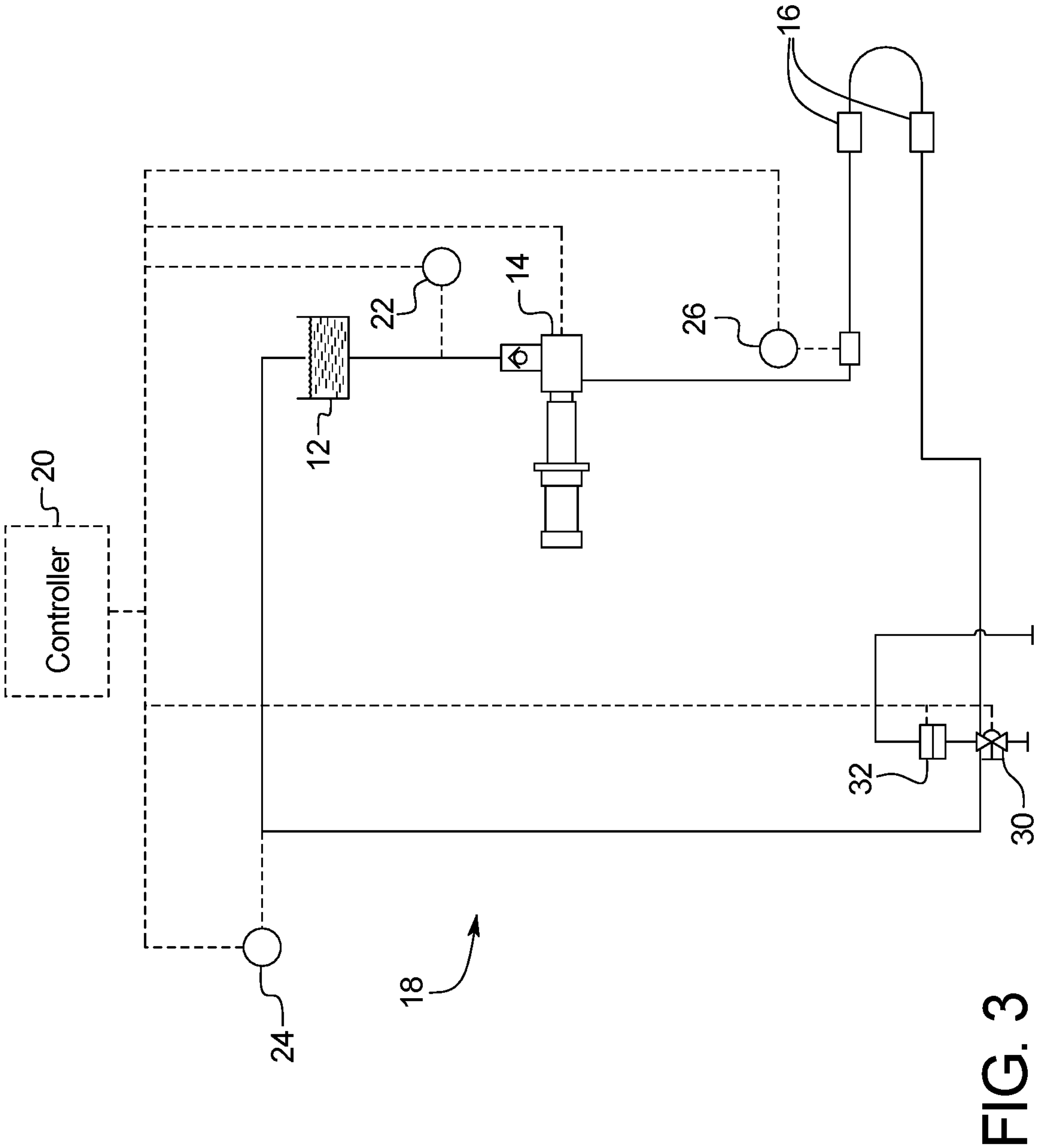
FIG. 3 shows a schematic of an alternative example embodiment of the recirculation flowpath of the high-pressure processing device of FIG. 1 without a heat exchanger.

In an alternative embodiment illustrated in FIG. 3, controller 20 can control the temperature of the unprocessed material as it makes multiple passes through processing module 16 without using heat exchanger 28. For example, controller 20 can monitor the temperature signals from inlet temperature sensor 22 and/or outlet temperature sensor 24 and control pump 14, low point drain valve 30 and/or a pressure relief valve 32 to raise and/or lower the temperature of the unprocessed material as desired. In an embodiment, controller 20 can control pump 14, low point drain valve 30 and/or a pressure relief valve 32 to lower the pressure through recirculation pathway 18 read by pressure sensor 26 if one or both of inlet temperature sensor 22 and/or outlet temperature sensor 24 indicates that the temperature is too high. Controller 20 can likewise control pump 14, low point drain valve 30 and/or a pressure relief valve 32 to raise the pressure through recirculation pathway 18 read by pressure sensor 26 if one or both of inlet temperature sensor 22 and/or outlet temperature sensor 24 indicates that the temperature is too low. By increasing the pressure, energy is added to the material to raise the temperature of the material, and be decreasing the pressure, energy is removed from the material to lower the temperature of the material.

Figure 4:
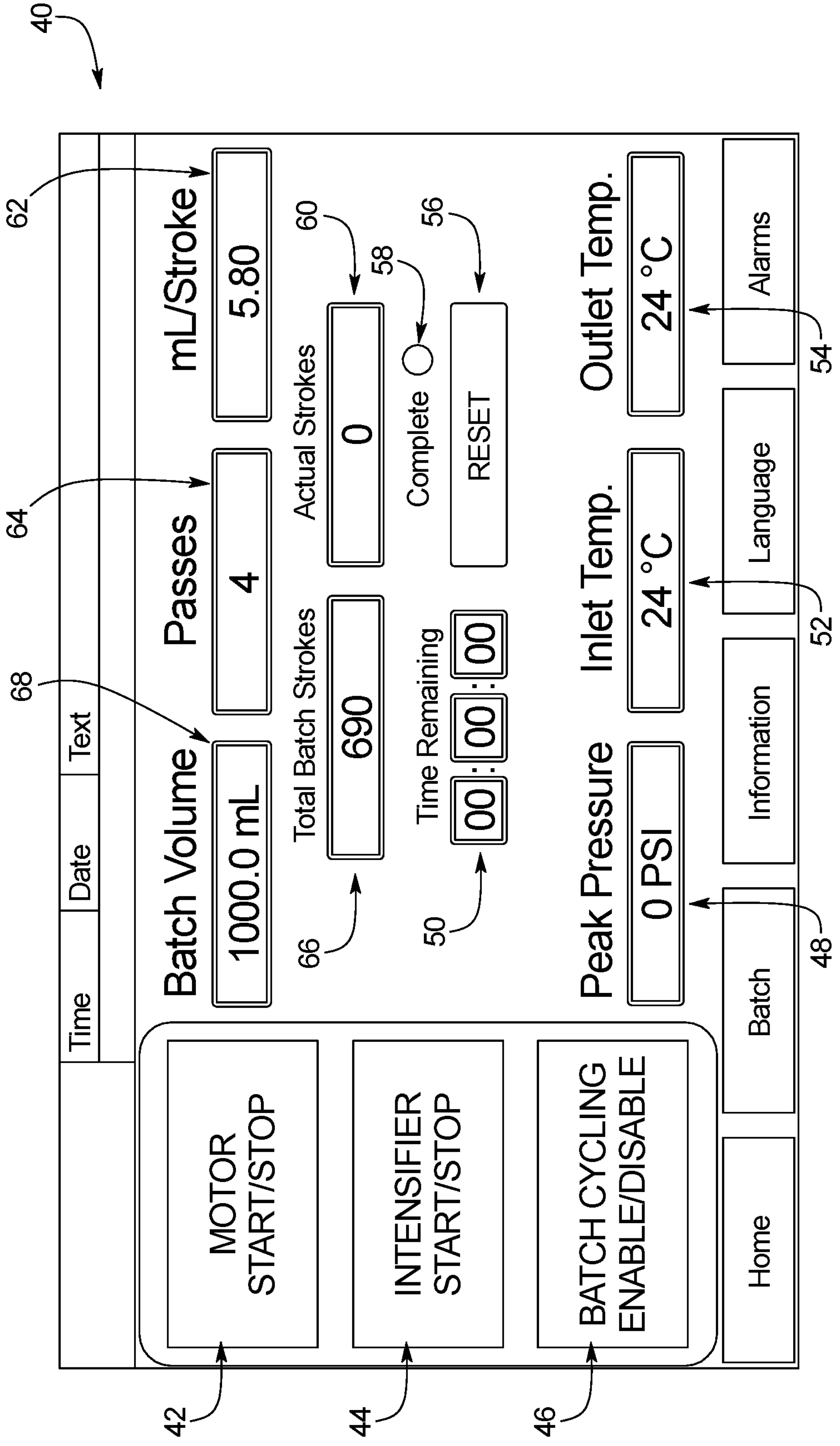
FIG. 4 shows a front view of an example embodiment of the user interface of the high-pressure processing device of FIG. 1.

FIG. 4 shows a detailed view of user interface 40 of device 10. As illustrated, user interface 40 includes a pump stop/start button 42, an intensifier stop/start button 44, a batch cycling enable/disable button 46, a peak pressure readout 48, a time remaining readout 50, an inlet temperature readout 52, an outlet temperature readout 54, a reset button 56, a complete readout 58, an actual strokes readout 60, a mL/stroke readout 62, a number of passes readout 64, a total batch strokes readout 66 and a batch volume readout 68. Each of the above features is discussed in more detail below.

Use of device 10 begins with recirculation pathway 18 being primed with unprocessed material from reservoir 12. Pump 14 is then turned on for a plurality of strokes (e.g., five strokes), and unprocessed material is pumped through pump 14 and collected to determine a volumetric efficiency, which is defined by mL of material per stroke. For example, if 30 mL are pumped through pump 14 after 5 strokes, the volumetric efficiency of pump 14 for the particular unprocessed material is 6 mL/stroke. The volumetric efficiency can change based on the type and/or viscosity of the unprocessed material, the type of pump, and/or the operating conditions of device 10.

Once the volumetric efficiency has been determined, the volumetric efficiency is recorded by controller 20. In an embodiment, a user can determine the volumetric efficiency by pumping the unprocessed material through pump 14 and collecting the unprocessed material in a graduated cylinder, and then the user can program the volumetric efficiency into user interface 40, so that the volumetric efficiency can be displayed by mL/stroke readout 62. Alternatively, device 10 can include a collection vessel and can collect the unprocessed material in the collection vessel, and controller 20 can automatically calculate the volumetric efficiency of the unprocessed material based on the volume of material collected in the collection vessel and the number of strokes by pump 14 to pump the volume of material into the collection vessel. In another embodiment, a flowmeter can be included at the outlet of pump 14, and readings from the flowmeter can be used with the number of strokes by pump 14 to calculate the volumetric efficiency of the unprocessed material.

In an embodiment, controller 20 can save the volumetric efficiency so that the volumetric efficiency can be reused at a later time when the same unprocessed material is processed by device 10. As explained above, however, volumetric efficiency can change based on the type and/or viscosity of the unprocessed material, the type of pump, and/or the operating conditions of device 10, so the saved volumetric efficiency can only be reused under identical conditions. In another embodiment, parameters such as batch size, number of passes and volumetric efficiency can be saved to a recording device, for example to a comma-separated values (CSV) file, so that the parameters can be used at a later time.

After the volumetric efficiency is recorded, the user can program a total batch volume into user interface 40 to be displayed by batch volume readout 68, and/or the user can program a desired number of passes of the unprocessed material through processing module 16 into user interface 40 to be displayed by passes readout 54. Alternatively, controller 20 can automatically calculate the total batch volume based on known variables programmed into the controller. In an embodiment, controller 20 can determine the volume of unprocessed material in reservoir 12 using a sensor, for example a weight or level sensor 74, and use the determined volume to calculate the total batch volume. For example, controller 20 can calculate the batch volume by weight via a pressure sensor if the product density is known, or by a level sensor in reservoir 12.

Controller 20 can then calculate the total number of strokes needed to pump the unprocessed material through processing module 16. For example, if the volumetric efficiency is 6.0 ml/stroke, and there is a total volume of 500 mL, and it takes 5 passes through processing module 16 to reduce the particle size of the unprocessed material to the desired amount, controller 20 can determine that it will take 417 strokes to circulate all 500 mL of unprocessed material through processing module 16 five times. Controller 20 can also determine the time that the total batch process will take by measuring the time for each stroke. In an embodiment, controller 20 can calculate and display the number of strokes remaining until the batch is complete and/or the time remaining until the batch is complete.

The device 10 is then ready to begin circulating the unprocessed material through processing module 16. The user can press the pump stop/start button 42, intensifier stop/start button 44 and batch cycling enable/disable button 46 to begin the batch process. Alternatively, a single button can start the process, or controller 20 can automatically begin the process once it has all of the necessary information calculated and/or entered by a user.

Controller 20 will then automatically run the batch process by controlling pump 14 so that pump 14 performs the number of strokes necessary for the total batch volume of unprocessed material to make the desired number of passes through processing module 16. The time remaining can be calculated by device 10 based on known variables such as the time for a single pump stroke and can be displayed by time remaining readout 50, the sensed pressure from pressure sensor 26 can be displayed by peak pressure readout 48, the temperature from inlet temperature sensor 22 can be displayed by inlet temperature readout 52, and the temperature from outlet temperature sensor 24 can be displayed by outlet temperature readout 54. When pump 14 has performed the determined number of strokes, controller 20 can automatically shut down pump 14 and cause the processed material to be output. The controller can then cause a complete readout 58 to light up, indicating that the total number of passes is complete and that the unprocessed material has been reduced to the desired particle size.

While controller 20 is running the batch process, controller 20 is continuously receiving feedback from, for example, inlet temperature sensor 22, outlet temperature sensor 24 and pressure sensor 26, and is controlling pump 14, heat exchange 28, low point drain valve 30, pressure relief valve 32 and/or other elements of device 10 based on the feedback. If controller 20 needs to stop or adjust pump 14 for any reason during the batch process, for example to correct an alarm condition by reducing pressure in recirculation pathway 18 or adjusting the temperature of the unprocessed material or any other element of device 10, controller 20 can save the progress of the batch process, and pick up from the stopped or adjusted point when the alarm condition has been corrected. In an embodiment, controller 20 can halt or adjust pump 14 based on feedback from inlet temperature sensor 22 and/or outlet temperature sensor 24, pause the batch therapy until it is determined from inlet temperature sensor 22 and/or outlet temperature sensor 24 that the temperature has dropped to an acceptable level, and then restart or readjust pump 14 and pick up from the point in the batch process where pump 14 was halted. Controller 20 therefore allows precise control of the particle size of the unprocessed material even in the event that the batch process is interrupted. Controller 20 can also stop or adjust pump 14 and save the progress of the batch process if there is user intervention, and can pick up from the stopped or adjusted point when the user restarts the process. Controller 20 can also automatically adjust the time remaining readout 50 when such a stoppage occurs.

Referring again to FIG. 3, controller 20 can also use feedback from inlet temperature sensor 22, outlet temperature sensor 24 and/or pressure sensor 26 to control the temperature of the unprocessed material without the need for heat exchanger 28. In an embodiment, controller 20 can cause energy to be added to the unprocessed material to raise the temperature of the unprocessed material if the temperature is too low and/or can cause energy to be removed from the unprocessed material to lower the temperature of the unprocessed material if the temperature is too high. In an embodiment, controller 20 can cause energy to be added to the unprocessed material by increasing the pressure through recirculation pathway 18, and controller 20 can cause energy to be removed from the unprocessed material by decreasing the pressure through recirculation pathway 18. In an embodiment, controller 20 can increase or decrease the pressure by controlling one or more of pump 14, low point drain valve 30 and/or a pressure relief valve 32. In an embodiment, pump 14, low point drain valve 30, pressure relief valve 32 and/or additional pumps and valves can be positioned to control the temperature at any point along recirculation path 18, for example, at an inlet or outlet to reservoir 12 and/or at an inlet or outlet to processing module 16. The temperature at the inlet of reservoir 12 can be adjusted, for example, by arranging the pumps and valves at or near the inlet so that the pressure is increased or decreased at or near the inlet. Those of ordinary skill will understand that the pumps and valves can be arranged to adjust pressure at other locations along recirculation pathway 18.

In an embodiment, controller 20 receives a sensor reading from inlet temperature sensor 22 and/or outlet temperature sensor 24 indicating that the temperature of the unprocessed material is below a threshold or optimal value or outside of a range. To raise the temperature of the unprocessed material above the threshold, to or near the optimal value, or within the range, controller 20 can cause pump 14, low point drain valve 30 and/or a pressure relief valve 32 to increase the pressure through recirculation pathway 18, for example, by increasing the speed of pump 14 and/or closing low point drain valve 30 and/or a pressure relief valve 32. Controller 20 can precisely control the pressure by controlling the speed of pump 14 and/or opening and closing low point drain valve 30 and/or a pressure relief valve 32 while monitoring the pressure with pressure sensor 26.

In an embodiment, controller 20 receives a sensor reading from inlet temperature sensor 22 and/or outlet temperature sensor 24 indicating that the temperature of the unprocessed material is above a threshold or optimal value or outside of a range. To lower the temperature of the unprocessed material below the threshold, to or near the optimal value, or within the range, controller 20 can cause pump 14, low point drain valve 30 and/or a pressure relief valve 32 to decrease the pressure through recirculation pathway 18, for example, by decreasing the speed of pump 14 and/or opening low point drain valve 30 and/or a pressure relief valve 32. Controller 20 can precisely control the pressure by controlling the speed of pump 14 and/or opening and closing low point drain valve 30 and/or a pressure relief valve 32 while monitoring the pressure with pressure sensor 26.

Enabling controller 20 to control the temperature of the unprocessed material by controlling pressure instead of by using heat exchanger 28 is advantageous for several reasons. For example, heat exchanger 28 and its associated components and coolant can be eliminated from device 10, thereby simplifying the design and use of device 10. The pressure control also enables the temperature of the unprocessed material to be raised or lowered without having to stop the device if the temperature is outside of a threshold or optimal value or range. In some cases, stopping the circulation of the unprocessed material through recirculation pathway 18 can be detrimental and it is therefore necessary to keep the unprocessed material circulating or use a mixer or agitator to keep the unprocessed material in suspension during a stoppage. The pressure control of the present disclosure can eliminate the need for a mixer or agitator because the circulation does not need to be stopped for the temperature to be adjusted.

In an embodiment, controller 20 can use pressure control to heat or cool the unprocessed material to a desired temperature before beginning the batch processing passes. For example, if unprocessed material is stored at 20° C. in reservoir 12 and requires five passes through processing module 16 at 70° C., controller 20 can cause the unprocessed material to be circulated through recirculation pathway 18 at a higher pressure than will be used for the passes to raise the temperature to 70° C. Once the unprocessed material reaches 70° C. according to inlet temperature sensor 22 and/or outlet temperature sensor 24, controller 20 can reduce the pressure to maintain the 70° C. and begin the five passes through processing module 16.

In another embodiment, controller 20 can use pressure control to heat or cool the unprocessed material to a desired temperature during the batch processing passes. For example, if inlet temperature sensor 22 and/or outlet temperature sensor 24 indicates that the temperature of is outside of a threshold or optimal value or range, controller 20 can adjust pump 14, low point drain valve 30 and/or a pressure relief valve 32 to readjust the temperature of the material back to the optimal value or range. While the temperature is being adjusted, controller 20 can save the status of the pumping strokes, and then controller 20 can resume counting pumping strokes once the temperature of the material back to the optimal value or range. This way, controller 20 ensures that the material makes the required number of passes through processing module 16 at the desired temperature.

Figure 5:
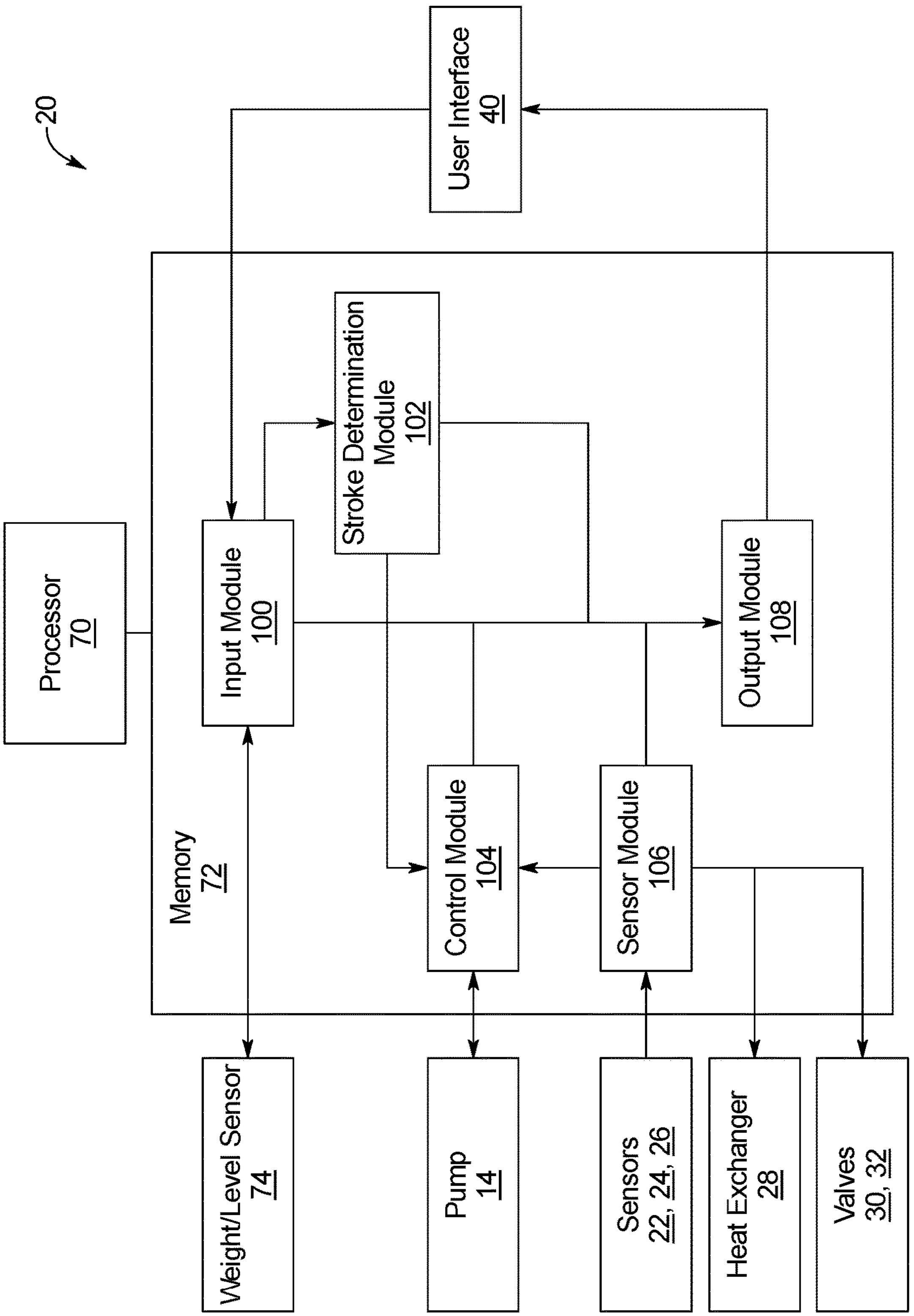
FIG. 5 shows a schematic of an example embodiment of modules that can be used with the high-pressure processing device of FIG. 1.

FIG. 5 shows an example embodiment of controller 20. As illustrated, controller 20 can include a processor 70 and a memory 72, which can include a non-transitory computer readable medium. Memory 72 can include, for example, an input module 100, a stroke determination module 102, a control module 104, a sensor module 106, and an output module 108. Processor 70 can run the modules in accordance with instructions stored on memory 72.

Input module 100 receives information that is input by a user into user interface 40. Input module can receive, for example, a volumetric efficiency determined by the user, a total batch volume determined by the user, a desired number of passes of the unprocessed material through processing module 16 determined by the user, and/or a desired temperature of the material determined by the user. Input module 100 can also provide the input information to output module 108 to be displayed by user interface 40. Input module 100 can also receive input information from various sensors, for example, weight/level sensor 74.

Stroke determination module 102 can receive data from input module 100 and calculate the total number of pump strokes needed to pump the unprocessed material through processing module 16. Stroke determination module 102 can also determine the time that the total batch process will take by measuring the time for each stroke. Stroke determination module 102 can also calculate any other parameters not input by the user. If the user did not input one or more of the volumetric efficiency, the total batch volume, the desired number of passes, and the desired temperature, stroke determination module 102 can also calculate these values if enough other variables are known. Stroke determination module 102 can provide the calculated information to control module 104 to be used to control pump 14, low point drain valve 30 and/or a pressure relief valve 32 and/or to output module 108 to be displayed by user interface 40.

Control module 104 can then control pump 14 according to the calculations from stroke determination module 102. Control module 104 is configured to count the number of strokes of pump 14 and shut off pump 14 when the total number of strokes needed to pump the unprocessed material through processing module 16 have been completed. If pump 14 needs to be shut off for any reason, control module is configured to record the number of strokes of pump 14 that have already occurred, so that when pumping resumes, control module 104 can pick up counting strokes where it left off. Control module 104 is therefore able to ensure that the material pumped through processing module 16 is precisely controlled, even in the event that pump 14 needs to be temporarily stopped or adjusted in the middle of a batch. Control module 104 can provide information regarding the pump strokes to output module 108 to be displayed by user interface 40. Control module 104 can also recalculate the total time remaining, if necessary, and sent the updated time remaining to output module 108 to be transmitted to user interface 40.

Sensor module 106 can receive sensor readings from inlet temperature sensor 22, outlet temperature sensor 24, pressure sensor 26 and/or any other sensor associated with device 10. Sensor module 106 can then compare the sensor readings to predetermined ranges or values and instruct control module 104 to stop or adjust pump 14 if the readings are outside of the predetermined ranges or values. When the readings return within the predetermined ranges or values, sensor module 106 can instruct control module 104 to resume or readjust pumping with pump 14. Sensor module 106 can also control, for example, heat exchanger 28 and valves 30, 32 to actively adjust the temperature or pressure within device 10. Sensor module 106 can provide information regarding the sensors to output module 108 to be displayed by user interface 40.

Output module 108 can output information to user interface 40 to be viewed by a user. Output module 108 can receive information from any of input module 100, stroke determination module 102, control module 104, and sensor module 106. For example, output module 108 can output a peak pressure reading from pressure sensor 26 via sensor module 106 to be displayed by peak pressure readout 48, a temperature from inlet temperature sensor 22 via sensor module 106 to be displayed by inlet temperature readout 52, a temperature from outlet temperature sensor 24 via sensor module 106 to be displayed by outlet temperature readout 54, a number of actual strokes counted by control module 104 to be displayed by actual strokes readout 60, a time remaining received from stroke determination module 102 or control module 104 to be displayed by time remaining readout 50, a completed reading from control module 104 when the last stroke of the total batch strokes has been counted by control module 104 to be displayed by complete readout 58, a total batch strokes determined by stroke determination module 102 to be displayed by total batch strokes readout 66, a volumetric efficiency received from input module 100 or stroke determination module 102 to be displayed by mL/stroke readout 62, a desired number of passes of the unprocessed material through processing module 16 received from input module 100 or stroke determination module 102 to be displayed by number of passes readout 64, and/or a total batch volume received from input module 100 or stroke determination module 102 to be displayed by batch volume readout 68.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A high pressure processing device comprising:

a processing module having a flow path with a geometry configured to convert a high pressure to shear or impact forces on a material passing through the processing module;

a pump configured to pump the material to an inlet of the processing module at the high pressure, the high pressure being between 5000 and 45000 psi;

a recirculation pathway configured to recirculate the material from an outlet of the processing module back to the pump;

an user interface including an input device configured to receive a user input indicating a quantity of passes for the material to make through the processing module; and a controller including a processor and memory, the controller configured to (i) determine a number of pump strokes for the pump based on the user input and (ii) control the pump according to the determined number of pump strokes so that the material makes the quantity of passes through the processing module.

2. The high pressure processing device of claim 1, wherein the controller is further configured to receive a volumetric efficiency, and to determine the number of pump strokes for the pump based, in part, on the volumetric efficiency.

3. The high pressure processing device of claim 2, wherein the volumetric efficiency is received as a user input to the input device.

4. The high pressure processing device of claim 2, further comprising:

a flow meter in communication with the controller, wherein the controller is configured to determine the volumetric efficiency based on information received from the flow meter.

5. The high pressure processing device of claim 1, wherein the input device is configured to receive user input indicating a batch size, and wherein the controller is further configured to determine the number of pump strokes for the pump based, in part, on the batch size.

6. The high pressure processing device of claim 1, wherein the input device is further configured to receive a desired temperature from the user.

7. The high pressure processing device of claim 6, further comprising:

a temperature sensor in communication with the controller, wherein the controller is further configured to stop or adjust the pump based on a comparison of the desired temperature with an indication of a current temperature of the material from the temperature sensor.

8. The high pressure processing device of claim 7, wherein the sensor measures the temperature of the material prior to the material reaching the inlet of the processing module.

9. The high pressure processing device of claim 7, wherein the sensor measures the temperature of the material prior to the material being output from the processing module, and prior to the material being recirculated.

10. The high pressure processing device of claim 7, wherein the controller is configured to stop the pump when the current temperature exceeds a temperature threshold, a save a count of the number of pump strokes which have been made while processing the material, and, after the temperature is below the temperature threshold, to resume pumping a remainder of the determined number of pump strokes.

11. The high pressure processing device of claim 1, wherein the processing module includes an impinging jet reactor.

12. The high pressure processing device of claim 1, a pressure sensor configured to measure pressure in the recirculation pathway.

13. The high pressure processing device of claim 12, wherein the controller is configured to adjust the pressure in the recirculation pathway by increasing or decreasing a speed of the pump.

14. The high pressure processing device of claim 12, wherein the controller is configured to adjust the pressure in the recirculation pathway by opening or closing a valve.

15. The high pressure processing device of claim 1, wherein the controller is configured to calculate a time remaining to complete processing the material, and to cause the user interface to display the time remaining.

16. A high pressure processing device comprising:

a processing module having a flow path with a geometry configured to convert a high pressure to shear or impact forces on a material passing through the processing module;

a pump configured to pump the material to an inlet of the processing module at the high pressure, the high pressure being between 5000 and 45000 psi;

a recirculation pathway configured to recirculate the material from an outlet of the processing module back to the pump;

an input device configured to receive a user input indicating a volumetric efficiency of the pump; and a controller including a processor and memory, the controller configured to (i) determine a number of pump strokes for the pump based on the user input indicating volumetric efficiency, and (ii) control the pump according to the determined number of pump strokes so that the material makes a predetermined plurality of passes through the processing module.

17. The high pressure processing device of claim 16, wherein the processing module includes an impinging jet reactor.

18. A high pressure processing device comprising:

a processing module having a flow path with a geometry configured to convert a high pressure to shear or impact forces on a material passing through the processing module;

a pump configured to pump the material to an inlet of the processing module at the high pressure, the high pressure being between 5000 and 45000 psi;

a recirculation pathway configured to recirculate the material from an outlet of the processing module back to the pump;

an input device configured to receive information from a file, the information including a batch size, a predetermined number of passes, and a volumetric efficiency of the pump for the material; and a controller including a processor and memory, the controller configured to (i) determine a number of pump strokes for the pump based on the received volumetric efficiency and batch size, and (ii) control the pump according to the determined number of pump strokes so that the material makes the predetermined number of passes through the processing module.

19. The high pressure processing device of claim 16, wherein the processing module includes an impinging jet reactor.

* * * * *